United States Patent
Kim et al.

(10) Patent No.: US 7,609,709 B2
(45) Date of Patent: Oct. 27, 2009

(54) VIDEO AWARE TRAFFIC MANAGEMENT

(75) Inventors: Taeho Kim, Dallas, TX (US); Frederick Skoog, Colleyville, TX (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 538 days.

(21) Appl. No.: 11/337,372

(22) Filed: Jan. 23, 2006

(65) Prior Publication Data
US 2007/0171928 A1 Jul. 26, 2007

(51) Int. Cl.
*H04L 12/28* (2006.01)
*H04J 3/04* (2006.01)

(52) U.S. Cl. ........................ 370/412; 370/535

(58) Field of Classification Search .......... 370/389, 370/392, 401, 412–421, 429, 535
See application file for complete search history.

(56) References Cited

U.S. PATENT DOCUMENTS

| | | | | |
|---|---|---|---|---|
| 7,295,519 B2 * | 11/2007 | Sandy et al. | ............ | 370/235 |
| 2001/0007560 A1 * | 7/2001 | Masuda et al. | ............ | 370/401 |
| 2001/0036157 A1 * | 11/2001 | Blanc et al. | ............ | 370/235 |
| 2002/0016832 A1 * | 2/2002 | Horrer et al. | ............ | 709/220 |
| 2004/0114576 A1 * | 6/2004 | Itoh et al. | ............ | 370/352 |
| 2004/0215807 A1 * | 10/2004 | Pinder et al. | ............ | 709/232 |
| 2006/0187825 A1 * | 8/2006 | Andersen | ............ | 370/229 |
| 2006/0187826 A1 * | 8/2006 | Chuang | ............ | 370/229 |
| 2006/0187828 A1 * | 8/2006 | Lee et al. | ............ | 370/229 |

FOREIGN PATENT DOCUMENTS

WO 9201345 A1 1/1992

OTHER PUBLICATIONS

Suri, et al.; A Comparative Evaluation of Space Priority Strategies in ATM Networks; INFOCOM '94; 13th Proceedings IEEE Networking for Global Communications; Jun. 12-16, 1994; pp. 516-523; vol. 2.
Xie, et al.; Cell Discarding Policies Supporting Multiple Delay and Loss Requirements in ATM Networks; GLOBECOM '97; IEEE Global Telecommunications Conference; Nov. 3-8, 1997; pp. 1075-1080; vol. 2.
European Search Report published Apr. 28, 2004.

\* cited by examiner

*Primary Examiner*—Hong Cho
(74) *Attorney, Agent, or Firm*—Garlick, Harrison & Markison, LLP

(57) ABSTRACT

A multiplexer selectively chooses packets for discarding during periods of congestion. In a first embodiment, thresholds for fill levels of a FIFO queue are set for a plurality of priority types. As thresholds are exceeded, incoming packet below a set priority level will be prevented from entering the queue and packets at the front of the queue below the set priority will be discarded. In a second embodiment, packets within a queue may be marked for deletion. A forward/discard list assigns an index to a new packet and maintains a list of the stream associated with each packet. A priority index list maintains a list of packets for each priority type by index number. A video metadata buffer stores the metadata for each enqueued packet. A physical video buffer stores the packets. When an incoming packet cannot be enqueued, packets of lower priority are detected by reference to the index list and marked for discard.

28 Claims, 12 Drawing Sheets

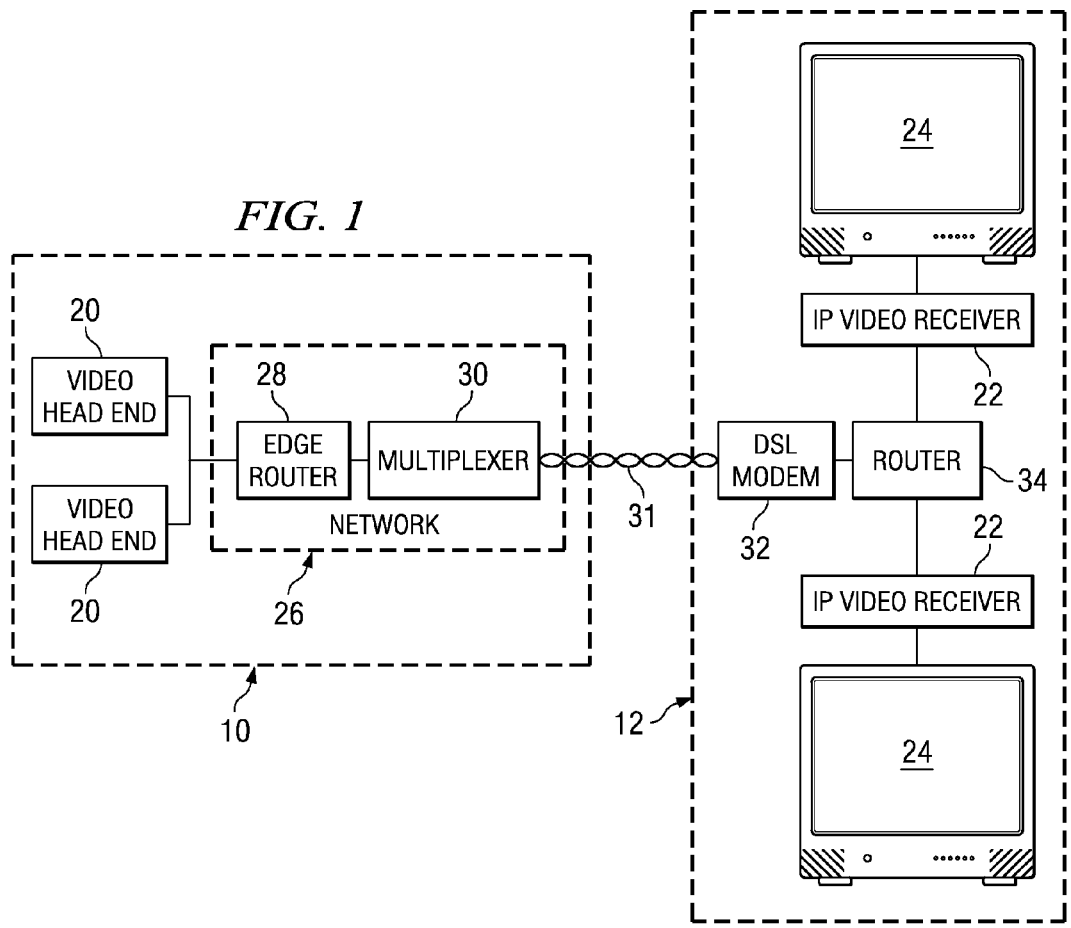

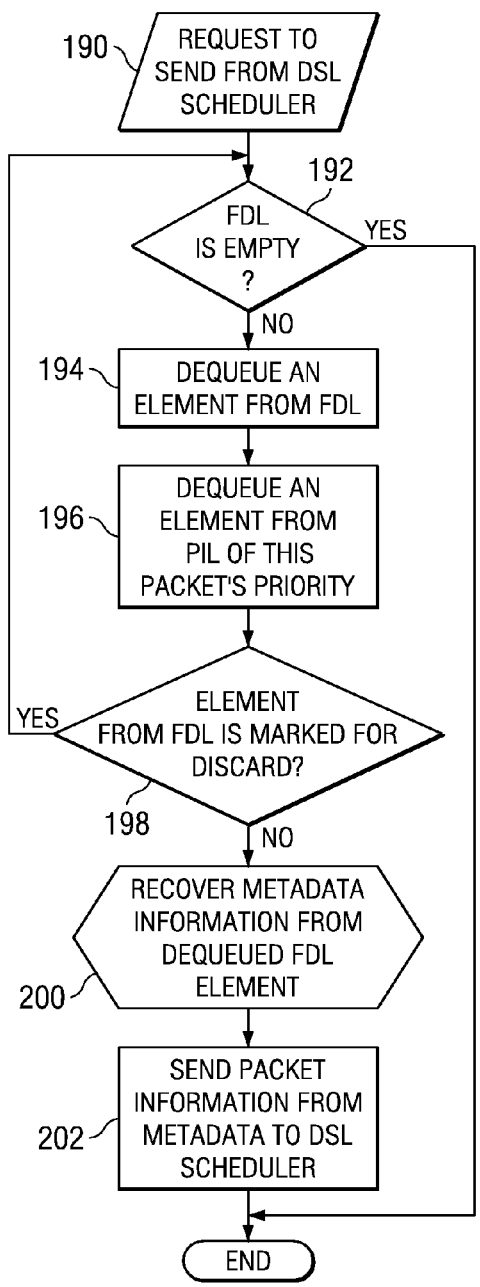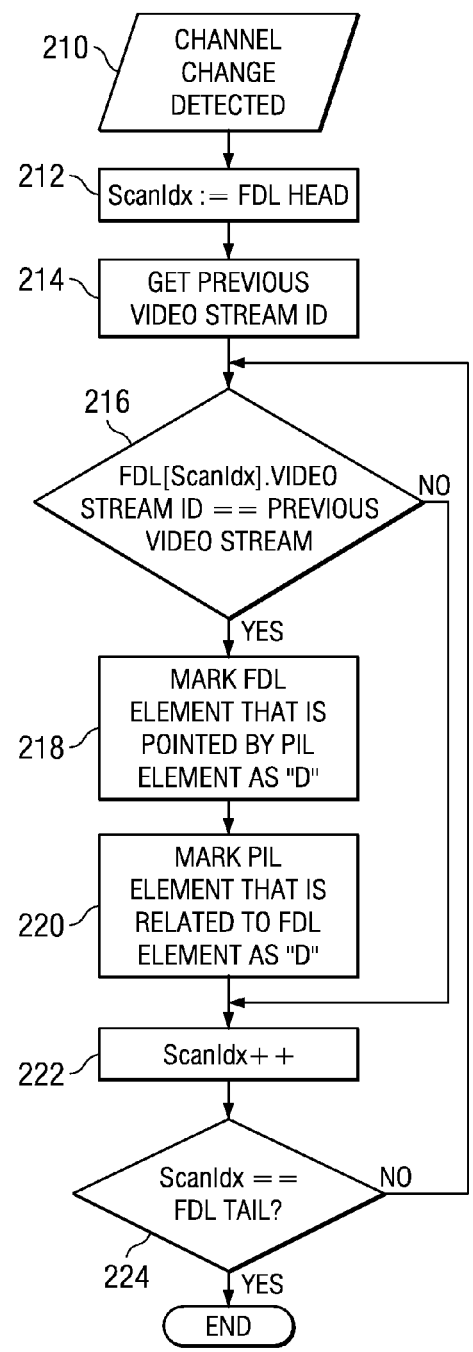

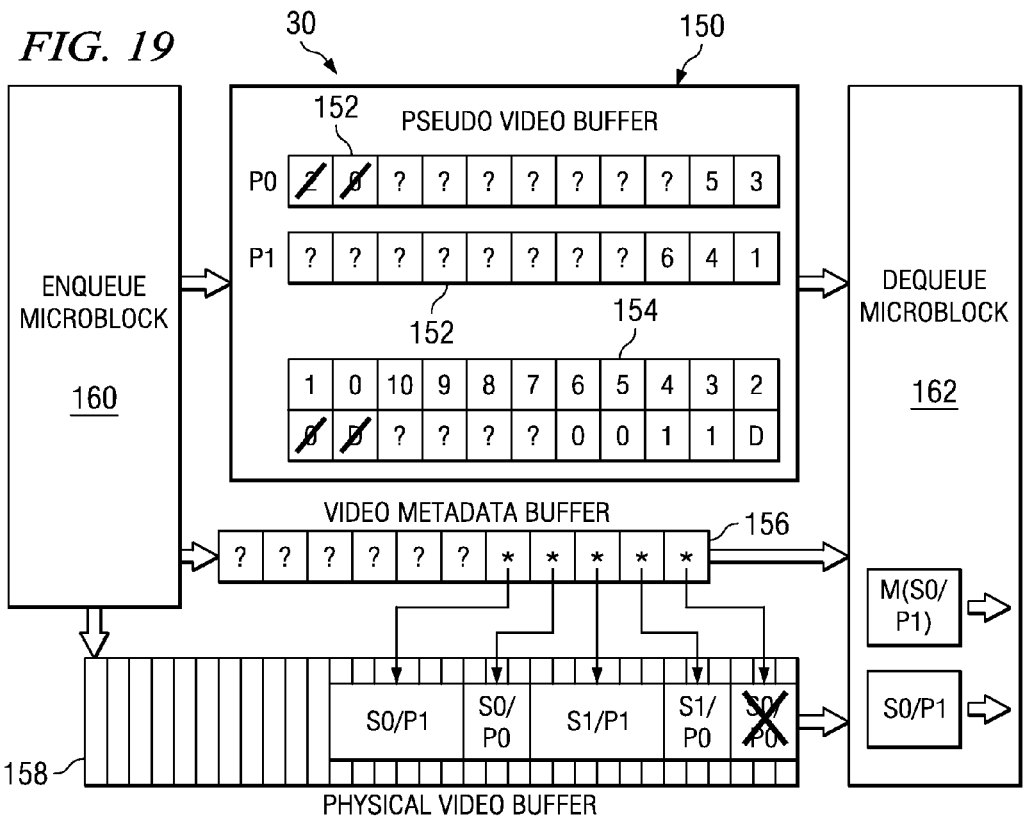
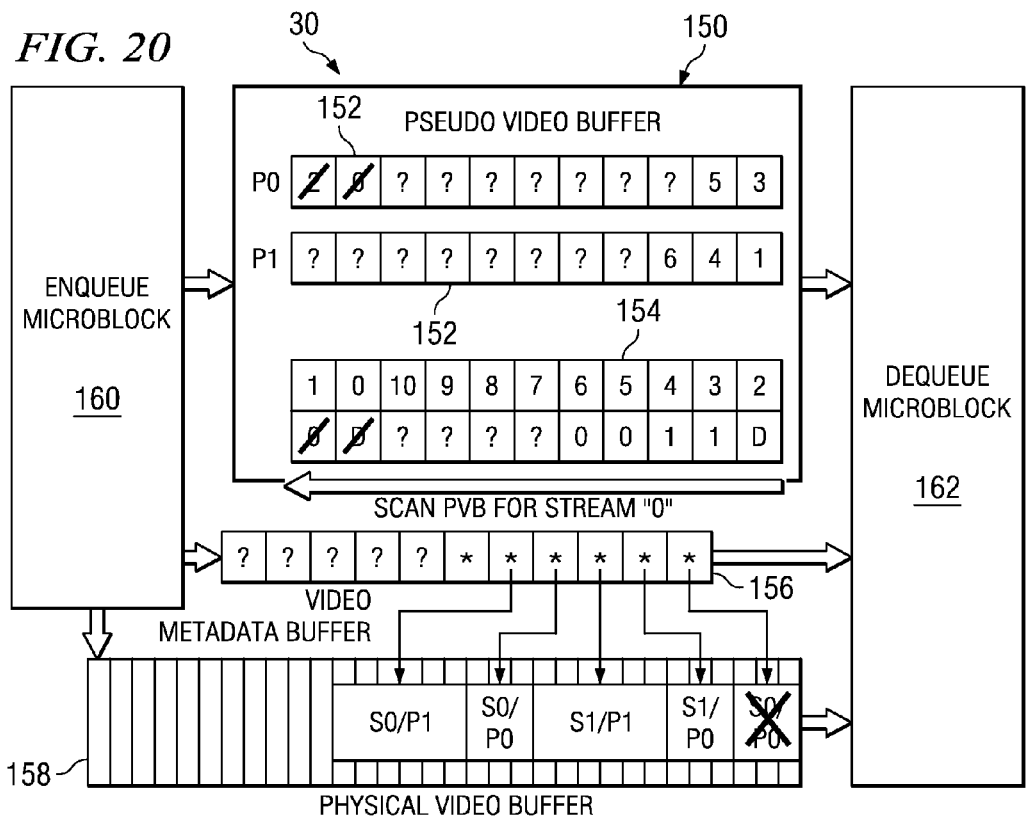

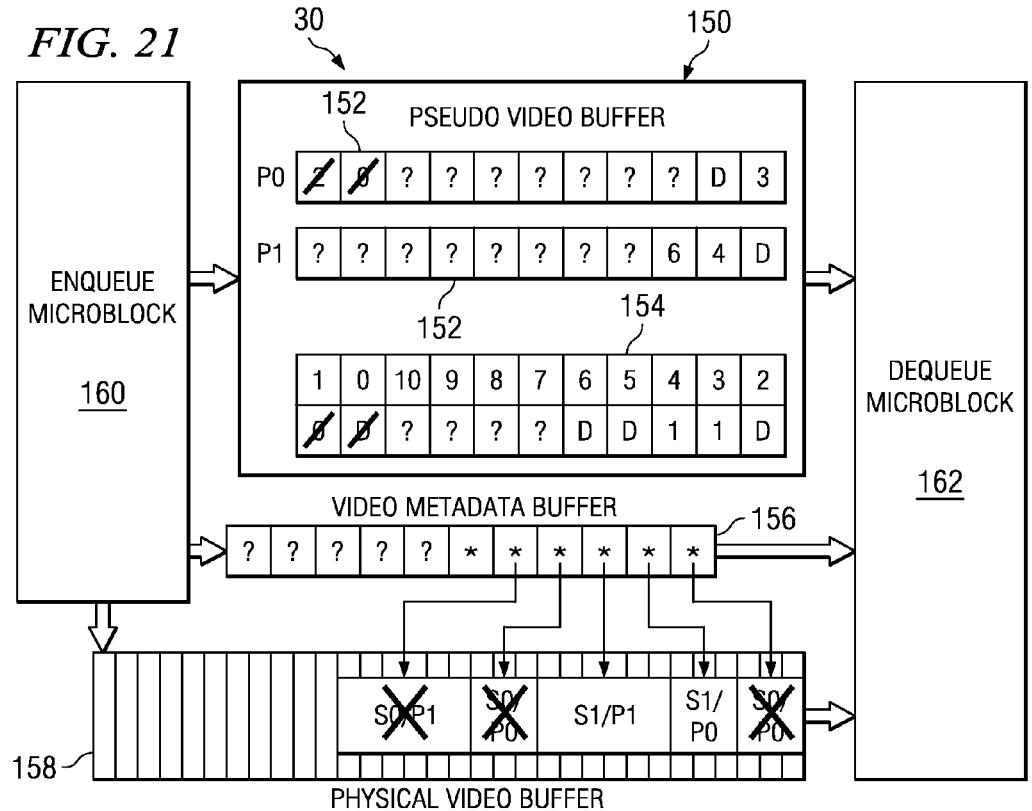
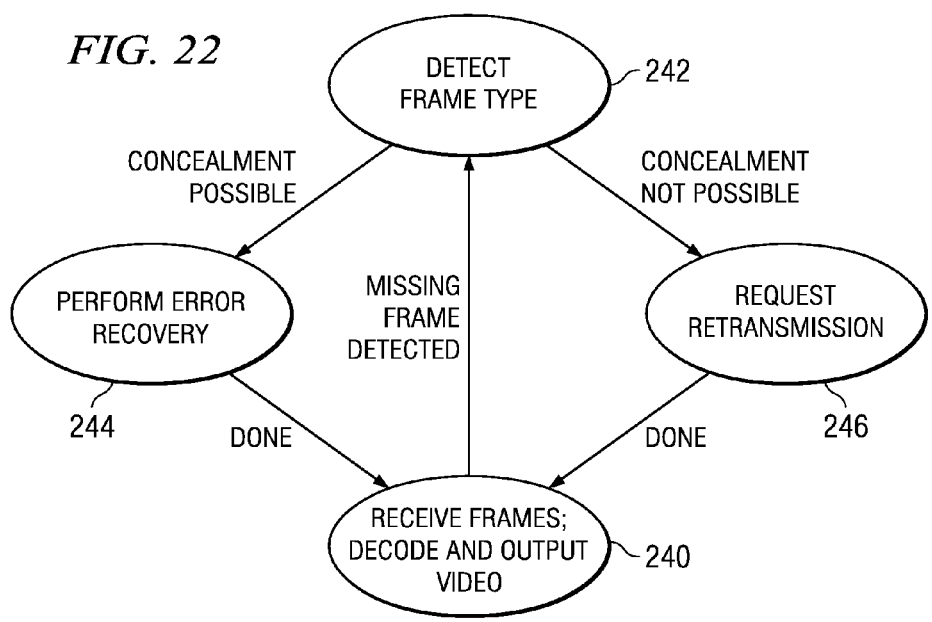

VIDEO AWARE TRAFFIC MANAGEMENT

STATEMENT OF FEDERALLY SPONSORED RESEARCH OR DEVELOPMENT

The U.S. Government has a paid-up license in this invention and the right in limited circumstances to require the patent owner to license others on reasonable terms as provided for by the terms of Award No. 70NANB3H3053 awarded by National Institute of Standards and Technology.

BACKGROUND OF THE INVENTION

1. Technical Field

This invention relates in general to network communications and, more particularly, to a method and apparatus for discarding packets.

2. Description of the Related Art

In a digital information delivery network, between a source device and a destination device, packets of data may be lost for a variety of reasons. Some packets are randomly lost due to uncontrollable errors—for example, errors caused by noise on a transmission line, synchronization issues, etc. Some packets are lost due to congestion, i.e., it is not possible for a network element to transmit all received packets in a timely manner. Current discard mechanisms for IP QoS (quality of service) algorithms implement random selection schemes to determine which packets to discard without regard to the relative effect on the eventual output.

For some data transfer protocols, missing packets cause the destination device to request a retransmission of the missing information. This is not very feasible, however, in a network that has multicasting of real-time streams such as audio or video. Normally, there will not be enough time available for requesting and receiving the retransmitted packets, unless buffers at the destination device are very large.

When an expected packet in a packet stream is not received at the destination device, the destination device waits for a certain amount of time before declaring a packet as lost. Once a packet is declared as lost, some decoders may request retransmission, other decoders may correct the problem to the extent possible by error concealment techniques. Error concealment techniques will in most cases result in degradation of output quality and are incapable of correcting some errors; further, the degree of the output error will be different depending upon the type of data in the lost packet, some of which will be more difficult to conceal than others. Thus, if packets must be discarded, some types of packets will be better candidates for discarding than others.

Accordingly, there is a need for a method and apparatus for identifying and discarding packets to minimize output errors.

BRIEF SUMMARY OF THE INVENTION

In a first aspect of the present invention, a multiplexer for broadband subscriber access comprises a memory queue for storing packets of video information and a plurality of control flags associated with respective priority, each flag indicating whether a respective predetermined threshold has been met by packets stored in the memory. Input circuitry selectively stores an incoming packet in the memory queue responsive to the control flags and a priority associated with the incoming packet.

This aspect of the present invention provides significant advantages over the prior art. By selectively discarding packets from the queue, the degradation of the resulting video during times of congestion is greatly improved. The control flag allow for discarding of packets using minimal processing resources.

In a second aspect of the present invention, a multiplexer for broadband subscriber access comprises a memory queue for storing video packets from multiple data streams, wherein each video packet is associated with one of a plurality of priority levels and a forward/discard list memory for associating each video packet in the queue with an index and an indicator of the data stream associated with the video packet. A priority index list memory maintains a list of packets associated with each of the plurality of priority levels. Input circuitry marks existing packets in the memory queue for discard based on information in the priority index list in order to accommodate incoming packets within one or more predetermined parameters.

This aspect of the present invention provides significant advantages over the prior art. By selectively discarding packets from the queue, the degradation of the resulting video during times of congestion is greatly improved. The priority index list and forward/discard list allow for marking packets for discard within a queue using minimal processing resources.

In a third aspect of the present invention, a receiver for generating an video output from a stream of data packets comprises circuitry for generating video frames from the packets and circuitry for decoding the stream of packets into a video signal, where the decoding circuitry includes circuitry for concealing errors due to missing frames of a first type. When a missing packet is detected, the receiver selectively conceals the error or requests retransmission, based on whether the missing packet is of said first type.

This aspect of the present invention provides for superior receiving performance by concealing errors due to missing or corrupt low priority video frames and requesting retransmission only when high priority video frames are missing or corrupt.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 1 illustrates a block diagram of a IP video delivery system;

FIG. 2 illustrates a block diagram of a multiplexer of FIG. 1;

FIG. 5 illustrates a diagram of a fragmented video frame;

FIG. 11 illustrates a flow chart describing the operation of an dequeue microblock for the multiplexer of FIG. 9;

FIG. 12 illustrates a flow chart describing the operation of an channel change logic for the multiplexer of FIG. 9;

FIGS. 13 through 21 illustrate an example of the operation of the multiplexer of FIG. 9;

FIG. 22 illustrates a state diagram showing operation for a receiver that selectively corrects errors by requesting retransmission or by error recovery techniques.

DETAILED DESCRIPTION OF THE INVENTION

Figure 3:
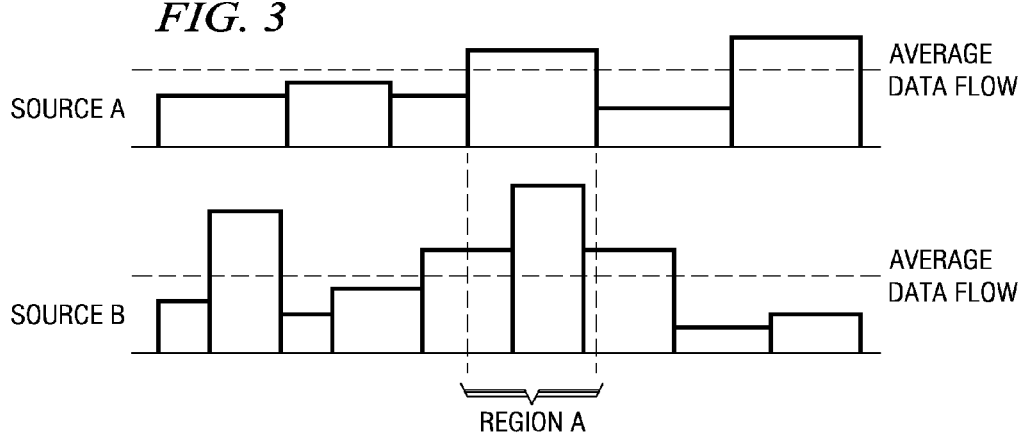
FIG. 3 illustrates how congestion can occur at the multiplexer because of aggregated data rates can exceed expected average aggregated data rates.

The present invention is best understood in relation to FIGS. 1-22 of the drawings, like numerals being used for like elements of the various drawings.

FIG. 1 shows a block diagram of an IP video network 10 for sending video programming to a site 12. Sources (such as video head ends, or VHEs) 20 provide the programming by streaming video information in packets. The packets are ultimately received by one or more IP video receivers 22 at the site 12. The IP video receivers 22 translate the video packets to video for video monitors 24. To get to the IP video receivers 22, the data must pass through a public/private network 26 which may include a plurality of routers, including edge router 28. The output of edge router 28 is received by multiplexer 30 (which could be, for example, a DSLAM access element), where the data for multiple video channels is multiplexed onto twisted pair lines 31. A modem 32 (such as a DSL modem) on the user site communicates between the multiplexer 30 and the IP video receivers 22 through on-site router 34.

In operation, the VHE sources 20 stream video information to the IP video receivers 22. For live video broadcasts, such as a live television signal, the video data is typically sent as a multicast transmission. For on-demand video, unicast transmission may be used. At the receiver side, on-demand video generally has a longer buffer, since the delay from source 20 to viewing is not important as broadcast video servers and, thus, on-demand video has a lower priority than live broadcast video services. The site 12 may have several IP video receivers 22 each receiving multiple streams of programming. For example, each IP video receiver 22 could receive two video data streams. If there were three IP video receivers 22 in the site 12, and each receiver 22 was receiving two video streams, then the link 31 between the multiplexer 30 and the modem 32 would be carrying video packets for six different data streams.

Modern day video protocols compress the video stream by periodically sending a full frame (compressed) of video data, followed by differential frames which indicate the changes between frames, rather than the frame itself. Accordingly, a scene which has a rapidly changing image will require a higher bandwidth than a frame that is relatively still. The total available bandwidth between the video heads 20 and the IP receivers 22 for a site 12 is generally fixed by the bandwidth of link 31, in view of the technology used by the multiplexer 30 and modem 32.

With a fixed bandwidth in which to transfer all packets for all data streams for a site 12, the number of data streams supported by the link 31 is determined by an average bandwidth for each received channel (link 31 can be carrying other data traffic such as Internet traffic, which has a lower priority than the live video data streams (lowest priority) and voice (VOIP—voice over Internet protocol, which generally has the highest priority). However, the data rates for the separate N data flows are not constant. At times, multiple channels may be simultaneously using more than their average bandwidth, resulting in congestion on link 31.

FIG. 2 illustrates a block diagram of the multiplexer 30 supporting N different data streams. For a system designed to provide viewing up to two data streams over three receivers 22, N would equal six. An input stage 40 receives various video streams and forwards packets to a FIFO (first in, first out) memories 42 (alternatively, multiple FIFOs could be used for respective data streams). An output stage 44 multiplexes packets from the FIFO memory 42 onto the link 31 (via DSL scheduling circuitry, not shown). At the site 12, router 34 directs packets to the proper receiver 22. Traffic Management System 46 controls the multiplexing of the packets from memories 42 onto the link 31, as described in greater detail below.

The congestion problem is illustrated in FIG. 3. When the combined data rates from the N sources exceed the capacity of the link 31 and the capacity of the multiplexer 30 to buffer the overage in its FIFO memories 42, the traffic management system 46 must make intelligent decisions about which packets to discard to minimize any adverse effects on data service to the end user. The situation is illustrated in FIG. 3, which employs only two data sources (N=2). In FIG. 3, data packets come from Source A and Source B. Each source implements a policy to provide data at a known average rate. The data from the two sources must be merged onto link 31, which has a capacity to accommodate the combined average data rates. Limited buffering is available from the FIFO memories 42; however, it is desirable to keep the FIFO memories as small as possible; otherwise a noticeable delay will occur when live video channels are switched. When the combined data rates from the sources exceeds the average for too long, the capacity to buffer the excess data is exceeded, and some packets must be dropped. Even if the multiplexer 30 has the memory capacity to buffer additional packets, it may need to drop packets because of timing considerations associated with its FIFO 42. For example, a multiplexer 30, may have a requirement that all packets will be sent within 200 ms of receiving that packet. If the condition cannot be met for an incoming packet, the multiplexer will either need to not place the incoming packet in the FIFO 42 or drop packets already in the FIFO 42.

In operation, the multiplexer 30 is designed to minimize the effect of dropping packets. A critical aspect of the problem is that all packets are time-critical. For each data stream all packets are generated on a single server (VHE 20). Once generated, each packet has a strict "use by" time. A packet that becomes stale in transit to the end user becomes unusable. To conserve shared link bandwidth, stale packets must be discarded without being transmitted over the link 31.

In operation, multiplexer 30 conforms to a policy that requires the minimum degradation of service to the end user when packets are discarded. This goal is accomplished in two basic ways: (1) the multiplexer 30 discards the minimum amount of data necessary to avoid congestion and (2) the multiplexer 30 makes use of a priority scheme to ensure the least useful packets are preferentially discarded.

Figure 4:
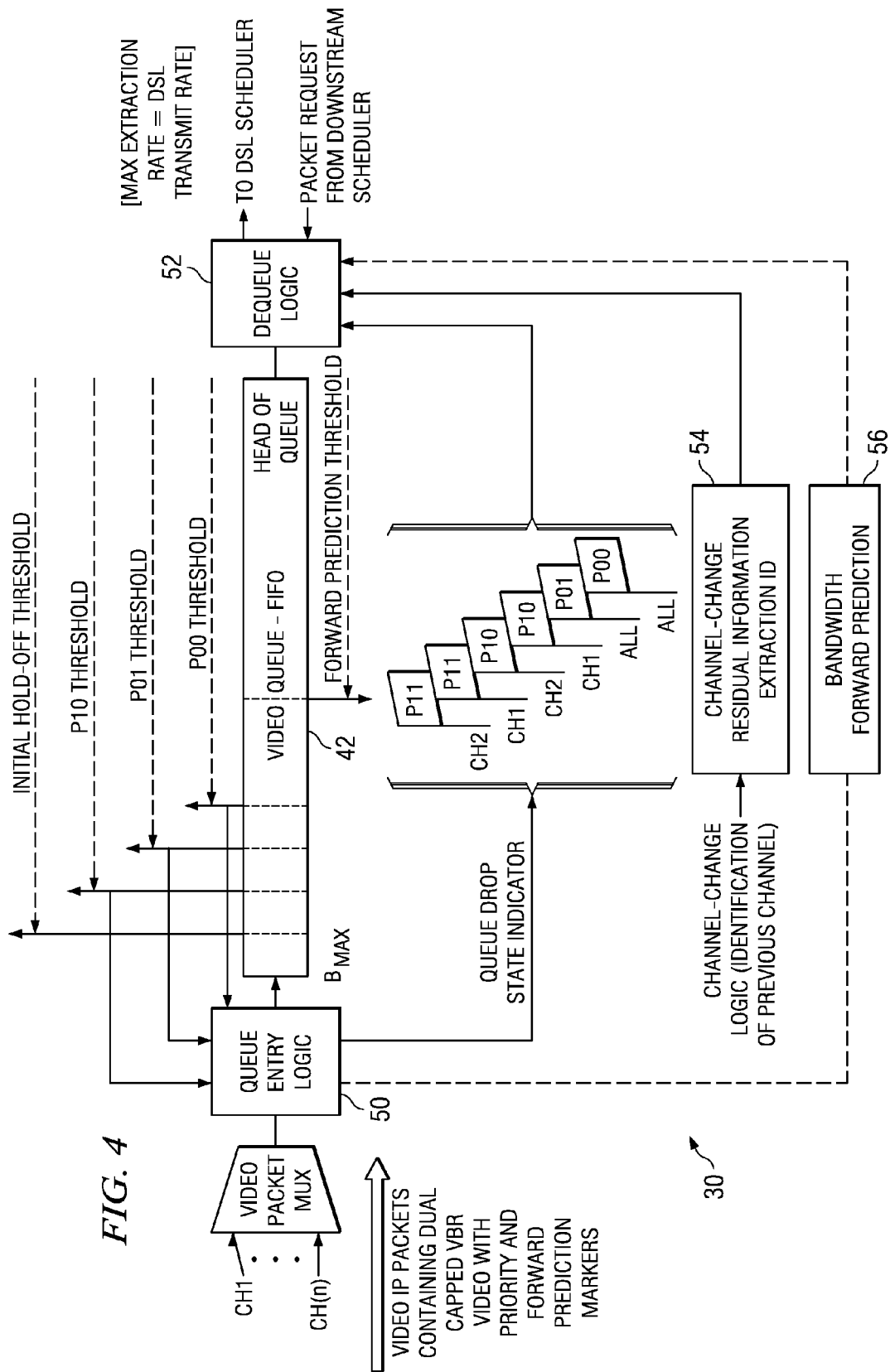
FIG. 4 illustrates a block diagram of a first embodiment of a multiplexer.

FIG. 4 illustrates a more detailed block diagram of the multiplexer 30 of FIG. 2, showing an embodiment which makes use of packets containing priority indicators. It is assumed that the priority indicators are generated by the video head end 20. For the illustrated embodiment, a two bit priority (four possible priority values) is used with "00" binary being the lowest priority and "11" binary being the highest priority.

The traffic management system 46 is split into queue entry logic 50, dequeue logic 52, channel change logic 54 and forward prediction logic 56. Each priority level has a threshold level in the FIFO 42, i.e., a P00 ("Priority 00") threshold, a P01 threshold, a P10 threshold and a P11 threshold. Additionally, there is an Initial Hold-off threshold. When a threshold level is exceeded, a flag is set (a "P00 FG" notation is used to represent the flag from priority "00"). It is assumed that the thresholds are based on a time-to-dequeue statistic. In other words, if the P00 threshold is set to 50 msec, it is exceeded if there are packets in the queue which will not be dequeued within 50 msec. Since there may be packets in the FIFO 42 that will not be transmitted, the physical location of a packet may not be indicative of whether a threshold level has been exceeded.

In the illustrated embodiment, a single FIFO 42 is used for multiple channels (multiple data streams). In the preferred embodiment, the low priority flags, P00 FG and P01 FG, are maintained on a global basis, i.e., one flag is used to indicate that a packet has exceeded a threshold, regardless of the channel associated with that packet. The higher priority flags, P10 FG and P11 FG, are maintained on a per channel basis; for example, if a packet on channel "1" exceeds the "10" threshold, the P10 flag is set for channel "1", but not for channel "2" (in the illustrated embodiment, only two channels are shown, although an actual embodiment may support more channels).

For background purposes, FIG. 5 illustrates the association between video frames and packets. Throughout the network 10, information is typically passed as Ethernet packets 58. Some video frames will be larger than an Ethernet packet 58 and, hence, must be fragmented into multiple packets. The receiver 22 will then group the packets back into video frames for decoding. In the preferred embodiment, as described below, if any packet of a video frame is discarded, then surrounding Ethernet frames are inspected by the traffic management system 46; for any frame in which a packet has been discarded, any remaining packets associated with that frame will be discarded as well, since these packets will have no value to the receivers 22. It should be noted that Ethernet frames occasionally are received out-of-order, and therefore the traffic management system 46 should search a sufficient distance from a discarded packet to ensure that all associated Ethernet frames have been properly inspected.

Figure 6:
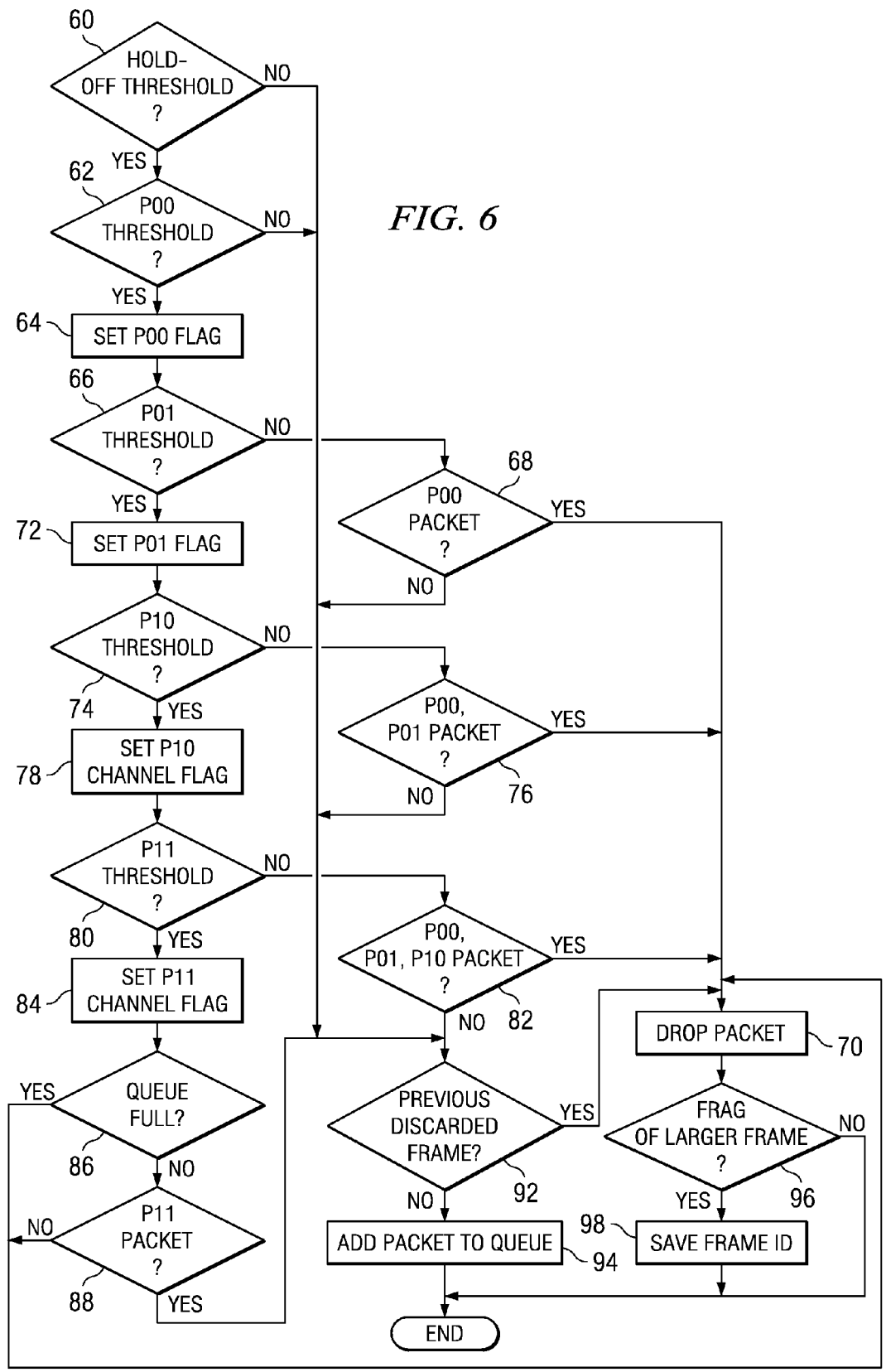
FIG. 6 illustrates a flow chart describing operation of queue entry logic for the multiplexer of FIG. 4.

FIG. 6 illustrates a flow chart describing the operation of the queue entry logic 50. The steps in FIG. 6 indicate the operation of the queue entry logic 50 for each packet that is received. In step 60 it is determined whether the initial hold-off threshold has been met. Until the hold-off threshold is met, no packets are dropped, even if the other priority thresholds have been exceeded. Once the initial hold-off threshold is met, subsequent packets will be checked to see if the priority thresholds are exceeded. In step 62, the queue entry logic 50 determines if queuing the packet in FIFO 42 will result in the priority threshold P00 being exceeded. If so, the P00 flag is set in step 64 and queue entry logic 50 determines if queuing the packet in FIFO 42 will result in the priority threshold P01 being exceeded in step 66. If the P01 threshold is not exceeded in step 66, the queue entry logic 50 determines whether the packet is a P00 packet in step 68. If so, it is discarded in step 70.

If in step 66, the P01 threshold is exceeded, then the P01 flag is set in step 72. The queue entry logic 50 determines if queuing the packet in FIFO 42 will result in the priority threshold P10 for the associated channel being exceeded in step 74. If the priority threshold P10 threshold for the channel is not exceeded in step 74, the queue entry logic 50 determines whether the packet is a P00 or a P01 packet in step 76. If so, it is discarded in step 70.

If in step 74, the P10 threshold is exceeded, then the P10 flag is set in step 78. Queue entry logic 50 determines if queuing the packet in FIFO 42 will result in the priority threshold P11 for the associated channel being exceeded in step 80. If the priority threshold P11 threshold for the channel is not exceeded in step 80, the queue entry logic 50 determines whether the packet is a P00, a P01 or a P10 packet in step 82. If so, it is discarded in step 70.

If in step 80, the P11 threshold is exceeded, then the P11 flag is set in step 84. Queue entry logic 50 determines whether the FIFO 42 is full in step 86. If so, the packet is discarded in step 70. If the FIFO is not full, then the queue entry logic 50 determines whether the packet is a P11 packet in step 88. If not, it is discarded in step 70.

If the P00 threshold is not exceeded in step 62 or if the packet is determined not to be a P00 packet in step 68, or not to be a P00/P01 packet in step 76 or not to be a P00/P01/P10 packet in step 82, or is determined to be a P11 packet in step 88, then it is checked to see if it is a fragment of a frame which has had packets previously discarded in step 92. If so, it is discarded in step 70; if not, it is added to the queue in step 94.

After a packet is discarded in step 70, the queue entry logic 50 determines whether it is a fragment of a larger frame in step 96. If so, the frame ID is saved in step 98 to match with other fragments from the same frame.

It should be noted that the flags are reset upon receiving n packets during which the condition for setting the flag no longer exists. The value n is a configurable value.

Figure 7:
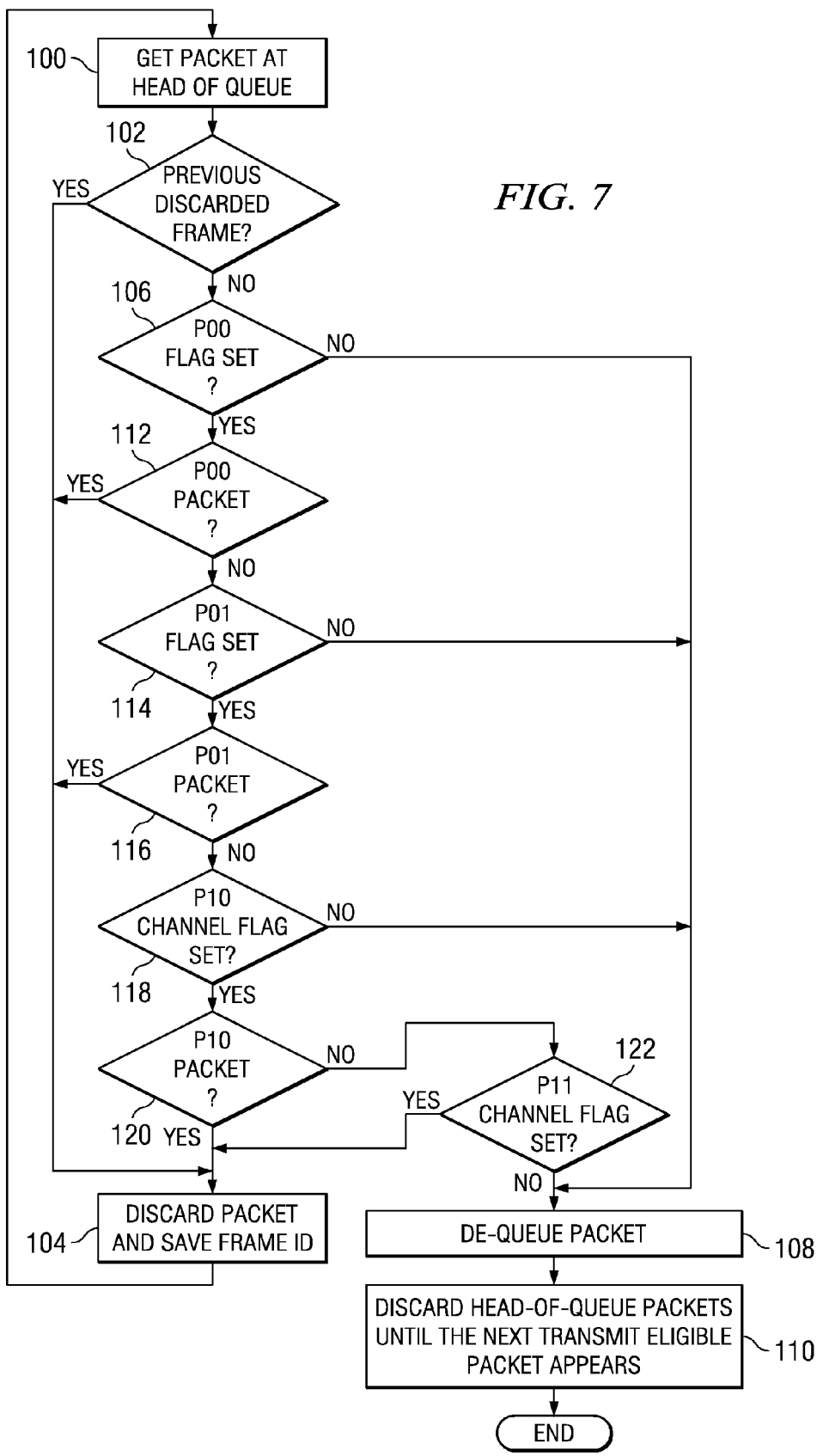
FIG. 7 illustrates a flow chart describing operation of the dequeue logic for the multiplexer of FIG. 4.

FIG. 7 illustrates flowchart describing operation of the dequeue logic 52. Upon a packet extraction request from the DSL scheduler (a request that the next packet be sent to the DSL scheduler for transmission on link 31), the dequeue logic 52 gets the next packet at the head of the FIFO 42 in step 100 checks to see if the next packet in line for output from FIFO 42 is a packet associated with a previously discarded frame in step 102. If so, it is discarded (not output) in step 104. If not, in step 106, the dequeue logic 52 determines whether the P00 flag is set; if not, the packet is dequeued (sent to the DSL scheduler for transmission on twisted pair lines 31) in step 108. After the packet is dequeued, there may be packets at the front of the queue which are not transmit eligible. The dequeue logic 52 will discard these packets until the next transmit eligible packet appears. The dequeue logic 52 then waits for the next request from the DSL scheduler.

If the P00 flag is set in step 106, then the packet will be discarded if it is a P00 packet (step 112). If the packet has a priority higher than P00 in step 112, the dequeue logic 52 will determine whether the P01 flag is set in step 114. If the P01 flag is set in step 114, then the packet will be discarded if it is a P01 packet (step 116). If the P01 flag is not set in step 114, the packet will be dequeued (step 108). If it is higher then a P01 packet in step 116, the dequeue logic 52 will determine whether the P10 flag is set (for the channel associated with the packet) in step 118. If the P10 flag for the channel is set in step 118, then the packet will be discarded if it is a P10 packet (step 120). If the P01 flag is not set in step 114, the packet will be dequeued (step 108). If the packet has a priority higher P10 packet in step 120, the dequeue logic 52 will determine whether the P11 flag is set (for the channel associated with the packet) in step 122. If the P11 flag for the channel is set in step 122, then the packet will be discarded. If the P11 flag is not set, the packet will be dequeued.

Figure 8:
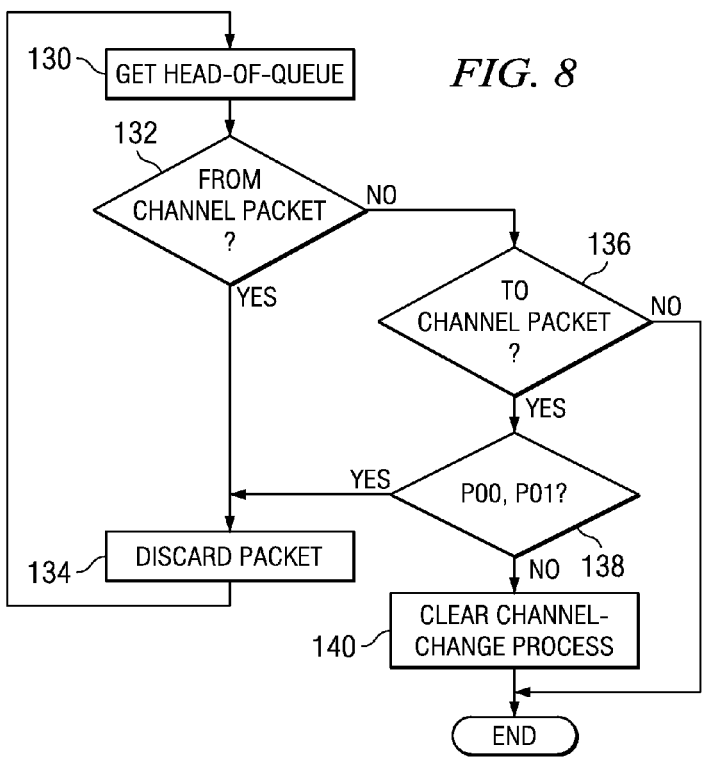
FIG. 8 illustrates a flow chart describing operation of channel change logic for the multiplexer of FIG. 4.

Referring again to FIG. 4, the channel change logic 54 speeds the process of discarding packets associated with a channel no longer being watched. FIG. 8 illustrates a flow chart describing the operation of the channel change logic 54. If the user changes channel (and assuming that no other user is watching the "from" channel), the old channel number (the "from" channel ID) and new channel number (the "to" channel) are sent to the channel change logic 54. Upon receiving this information, the channel change logic works with the dequeue logic 52 to remove packets associated with the "from" channel. The channel change logic 54 also removes low priority packets associated with the "to" channel since these packets will be associated with differential frames (i.e., frames dependent upon other video frames) and therefore useless to the receivers 22. If another receiver 22 remained tuned to the "to" channel, these packets would not be dropped.

In step 130, the next packet is taken from the head of the FIFO 42. If it is associated with the "from" channel in step 132, it is discarded in step 134. If it is not associated with the "from" channel, but is associated with the "to" channel in step 136, the packet is discarded if it is a low priority packet (P00 or P01) in step 138. If it is a high priority packet in step 138, then the channel-change clearing process is complete in step 140.

Referring again to FIG. 4, the forward prediction logic 56 receives information regarding upcoming packets that have not yet been received. The forward prediction logic can therefore make estimation of when additional space will be needed to accommodate packets of a specified priority. Accordingly, the discarding functions described above can be made prior to actual congestion occurring.

In the embodiment described above, FIFO thresholds are used to keep packets from entering the queue based on the threshold exceeded and a priority associated with the packet. This embodiment provides a method of passing high priority packets using a minimum amount of computation resources. A second embodiment is described below which operates in a different manner. When the buffer is full (i.e., when new packets will not reach the end of the FIFO buffer within the predetermined time limit), packets within the FIFO are marked for discard within the FIFO. When these marked packets reach the head of the FIFO, they are simply not passed forward for transfer over link 31.

FIGS. 9-19 illustrate a second embodiment of a multiplexer 30 where the access network equipment can recognize video traffic in order to make dropping decisions during congested periods to help minimize the service quality degradation. Some types of video packets are more important for the reproduction of high quality video than other types of video packets. The video packet discard decision is made upon video packet type and current congestion level such that least important packets (those that have the least impact on picture quality) are dropped first and the next least important packets are dropped next, and so on.

In this embodiment, packets already in the video queue can be marked for discard. Discarding enqueued packets results in faster video queue space recovery and can contribute to faster channel change support. This embodiment assumes that the video data streams are generated by an encoder or video server 20 that follows a set of rules, or a protocol, for transport of compressed video content on an IP packet network. More than one protocol definition may be accommodated. The protocols define how packet headers are assembled, and how video content priority indicators are coded at the application layer. The embodiment further assumes that the video data transport data rate is within the range defined for a particular network implementation. In addition, this embodiment assumes that a maximum packet size is defined at the application layer such that fragmentation at the lower layers will never be required. This is to ensure that every video packet entering the access node contains the video component priority indicators.

Figure 9:
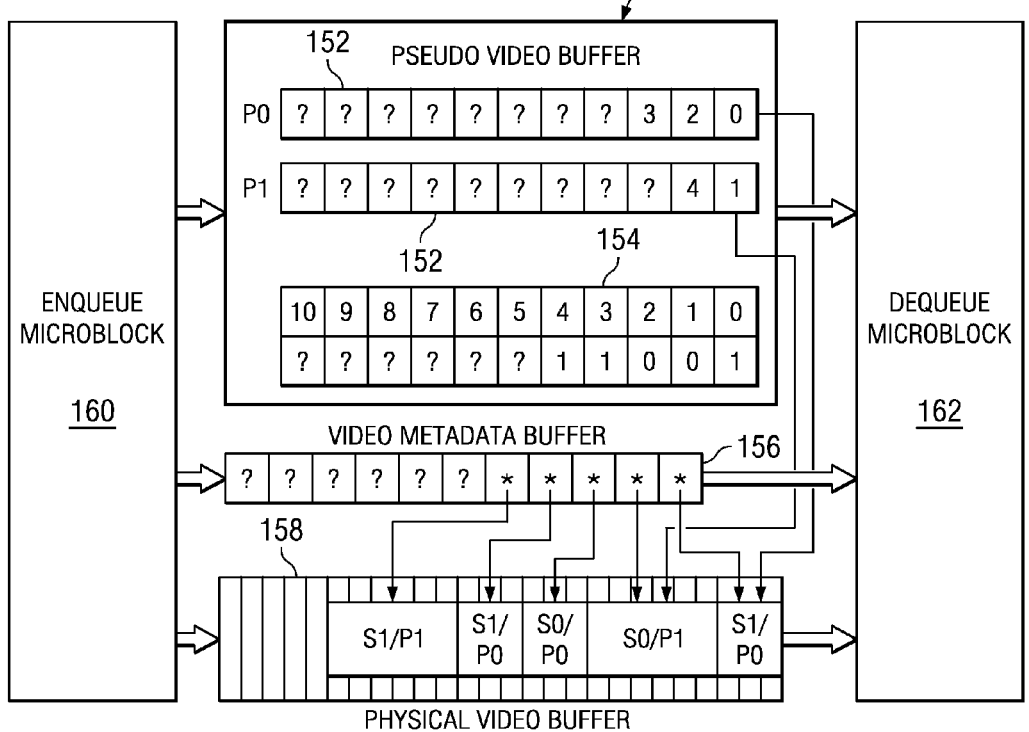
FIG. 9 illustrates a block diagram of a second embodiment of a multiplexer.

In FIG. 9, a per subscriber pseudo video queue (buffer) 150 includes per-priority index lists (PILs) 152 (with one priority index list 152 for each priority level—in the illustrated embodiment, there are only two priority levels, P0 and P1) and a forward/drop list (FDL) 154. A video metadata buffer 156 has entries containing the packet metadata for each packet enqueued in the physical video packet buffer 158. The pseudo video buffer 150, video metadata buffer 156 and physical video packet buffer 158 are coupled between the enqueue microblock 160 and the dequeue microblock 162. The physical video buffer stores packets identified by the priority of the task (P0 or P1) and the data stream (channel) associated with the packet (S0 or S1). In an actual embodiment, there could be additional priority levels and more data streams would likely be supported.

In operation, enqueue microblock 160 and dequeue microblock 162 control the flow of packets into and out of the multiplexer 30 and maintain the contents of the pseudo video queue 150 and video metatdata buffer 156. As video packets are received, they are stored in the physical video buffer 158. Each packet in the physical video buffer 158 has its metadata stored in an associated entry of the video metadata buffer 156. The metadata information is used for further packet processing. If multiple receivers 22 are subscribed to the same channel, multiple metadata will exist in the video metadata buffer 156 for the same video stream. The video metadata buffer 156 is preferably a FIFO queue of a predetermined finite depth that maintains the metadata in the order of the video packets.

When congestion is detected (i.e., the time between receiving a packet and transmitting the same packet exceeds a predetermined threshold), or if the physical video buffer 158 is full, packets within the physical video buffer 158 are marked for discard (when a packet marked for discard reaches the front of the physical video buffer 158, it will be removed without further transmission on the link 31). If there are no currently enqueued packets within the physical video buffer 158 that can be dropped to make room of the incoming packet, then the incoming packet will be dropped without enqueue.

The pseudo video buffer 150 is used to identify and mark packets for discard. The pseudo video buffer 150 uses circular buffers as its main data structure with head and tail pointers such that a new buffer entry is added at the tail and buffer entries are removed from the head. As shown below, this circular list data structure provides a simple mechanism to maintain the list.

The pseudo video buffer 150 includes a forward/drop list 154 and an index list 152 for each priority type. Each entry in the forward/drop list 154 is associated with an entry in the video metadata buffer 156. The contents of each entry in the forward/drop list 154 is either an indicator of the data stream (either "0" or "1" in the illustrated embodiment), if the packet is to be forwarded, or a discard marker ("D") to indicate that the associated packet is to be dropped. Each priority index list 152 maintains an index of packets by priority. By maintaining a separate list of packet for each priority, packets or metadata of a certain priority can be easily located for marking without scanning the entire queue.

Figure 10:
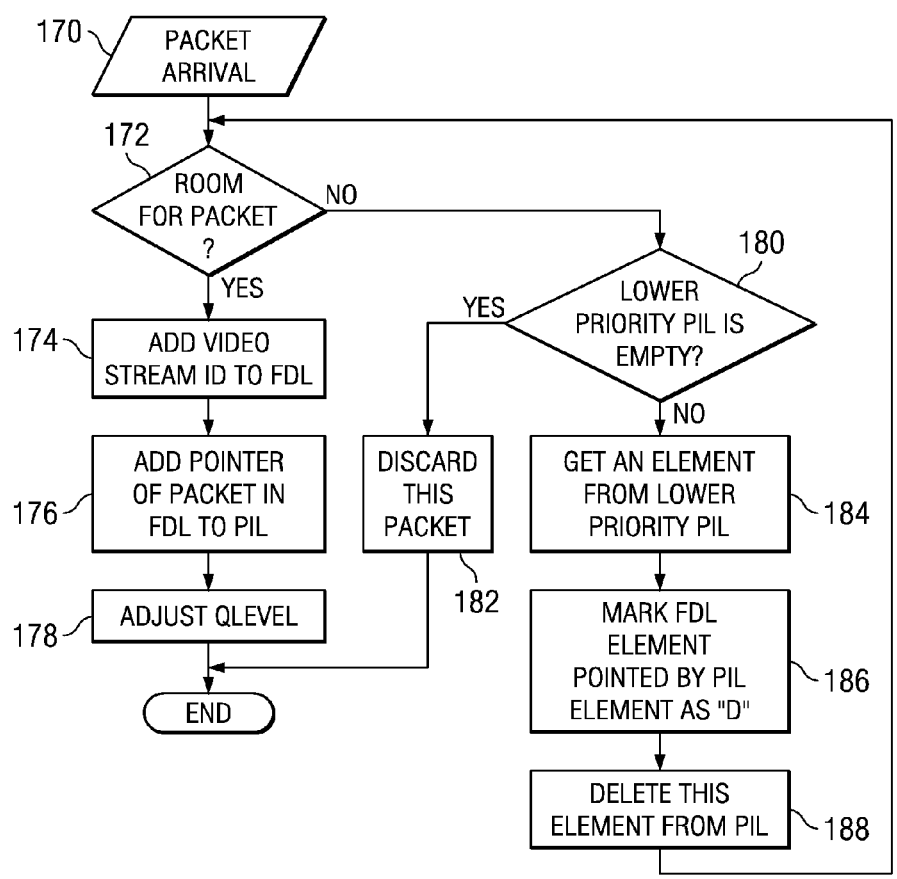
FIG. 10 illustrates a flow chart describing the operation of an enqueue microblock for the multiplexer of FIG. 9.

FIG. 10 is a flow chart that illustrates the operation of the enqueue microblock 160. When a video packet arrives in step 170, the enqueue microblock 160 determines whether the physical video buffer can accommodate the incoming packet in step 172. If so, the enqueue microblock 160 extracts packet information (such as priority, video stream ID, and so on) from the incoming packet and the packet is enqueued by inserting the packet's video stream ID in the forward/drop list 154 (step 174) and adds the forward/drop list index of the packet to the appropriate index list 152, depending on the priority information from the metadata (step 176). In step 178, the remaining queue level (QLevel) is adjusted to account for the newly enqueued video packet.

If the buffer is congested in step 172, the enqueue microblock looks at a index list 152 associated with lower priority packets (i.e., if the incoming packet is a P1 packet, the P0 index list will be used to determine whether there are lower priority packets in the physical video queue 158). If the appropriate index list 152 is empty in step 180, the incoming packet is discarded (not enqueued) in step 182. On the other hand, if the appropriate index list 152 is not empty in step 180, the lower priority packets designated in the index list 152 are marked for discard in the forward/drop list 154 to create additional space in the physical video buffer in steps 184-188. In the preferred embodiment, the enqueue process will only mark packets for discard until enough room is recovered to enqueue the incoming packet. In step 184, a packet is identified by an entry from the appropriate index list 152; the index in that entry points to a corresponding entry in the forward/drop list. That entry is marked for discard (by a "D" in the illustrated embodiment) in step 186. The entry is then deleted from the index list 152 and the queue level is adjusted to account for the discarded packet. Control continues at step 172, where it is determined whether the queue has room for the incoming packet after discarding the packet. If so, the incoming packet is enqueued in steps 174-178. If more space is needed to enqueue the incoming packet, the index lists are again checked for lower priority packets within the queue. The process is repeated until either enough room is obtained by discarding lower priority packets or, if no more room can be created, by discarding the incoming packet.

The operation of the dequeue microblock 162 is shown in FIG. 11. In step 190, a send request is received by the dequeue microblock 162 from the DSL transmit scheduler. If the forward/discard list (FDL) 154 is empty in step 192, then there are no packets to send at the current time. On the other hand, if the forward/discard list 154 indicates that there are packets to sent in step 192, then the next entry in the forward discard list 154 for the next packet to sent is dequeued in step 194, as well as the corresponding entry from the index list 192. In step 198, if the entry from the forward/discard list indicates that the packet has been marked for discard, then control returns to step 192 to look at the next packet in the physical video buffer 158. On the other hand, if the entry does not; indicate that the packet is not marked for discard, then the metadata for the packet is retrieved in step 200 and the packet is forwarded in step 202.

FIG. 12 illustrates a flow chart describing the operation of channel change logic. Fast channel change support can be accomplished by discarding the packets in the video buffer as soon as possible that are related to the previous video channel to make room for new video stream. When a channel change notice is received in step 210, a scan index (scanidx) is set to the head of the forward/discard list in step 212 and the video channel ID for the "from" channel is retrieved in step 214. The forward/discard list 154 is inspected at the scan index in step 216 to see if the stream at that entry matches the "from" channel data stream ID. If so, the forward/discard list is marked for discard at the entry specified by the scan index in step 218. In step 220, the corresponding index list entry is marked as discarded as well. In step 222, the scan index is incremented to find additional packets associated with the "from" channel. If the scan index is incremented to the tail of the forward/discard list in step 224, then all such packets have been found; otherwise the forward/discard list is searched again in step 216-220. In the event that an entry does not have a video stream ID that matches the "from" channel in step 216, then the scan index in incremented in step 222.

Figure 13:
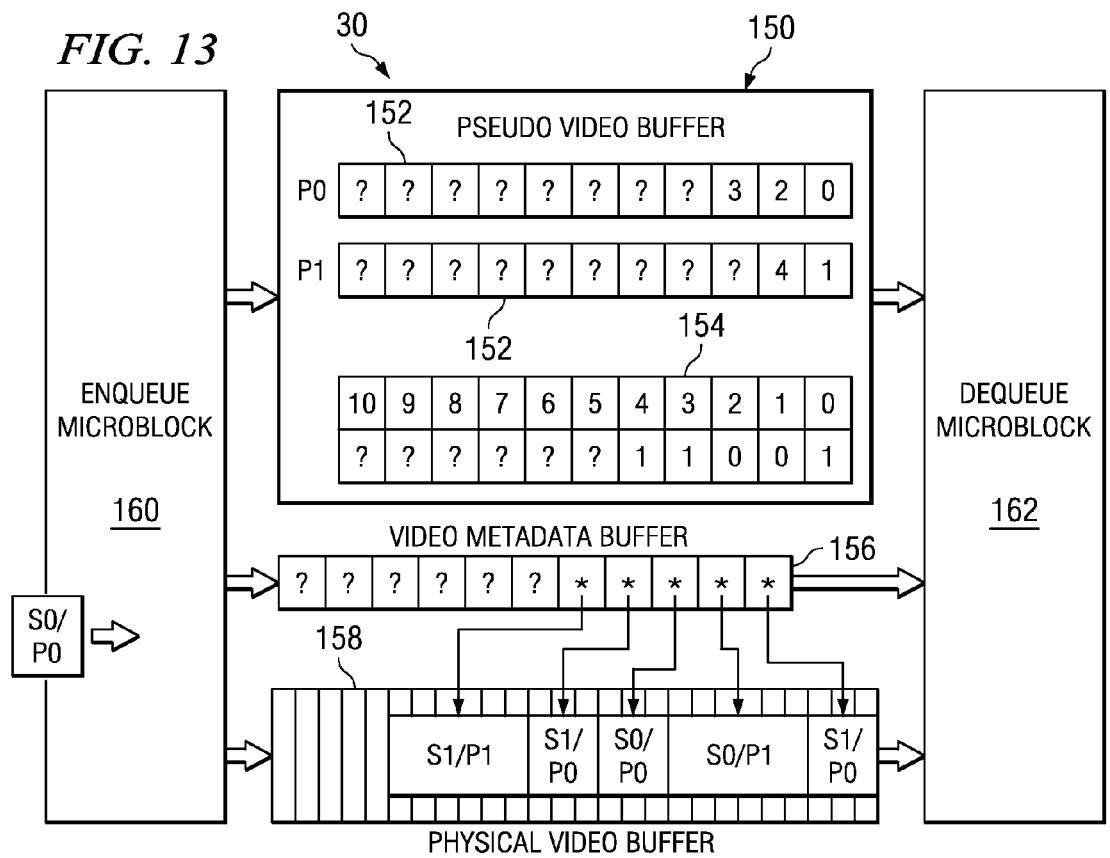

FIGS. 13-21 provide illustration of the operation of the multiplexer 30. FIG. 13 illustrates an instance of the initial state of the multiplexer 30, where the physical video buffer has a buffer depth of 26, with packets in physical video buffer 158 currently has five packets (S1/P0-length 3, S1, P0-length 6, S0/P0-length 3, S0/P1-length 6 and S1/P0-length3). Hence the fill level of the current packets is 21, leaving a length of 5 for new packets. An incoming packet (S0/P0) with a length of 3 is received at the enqueue microblock 160.

Figure 14:
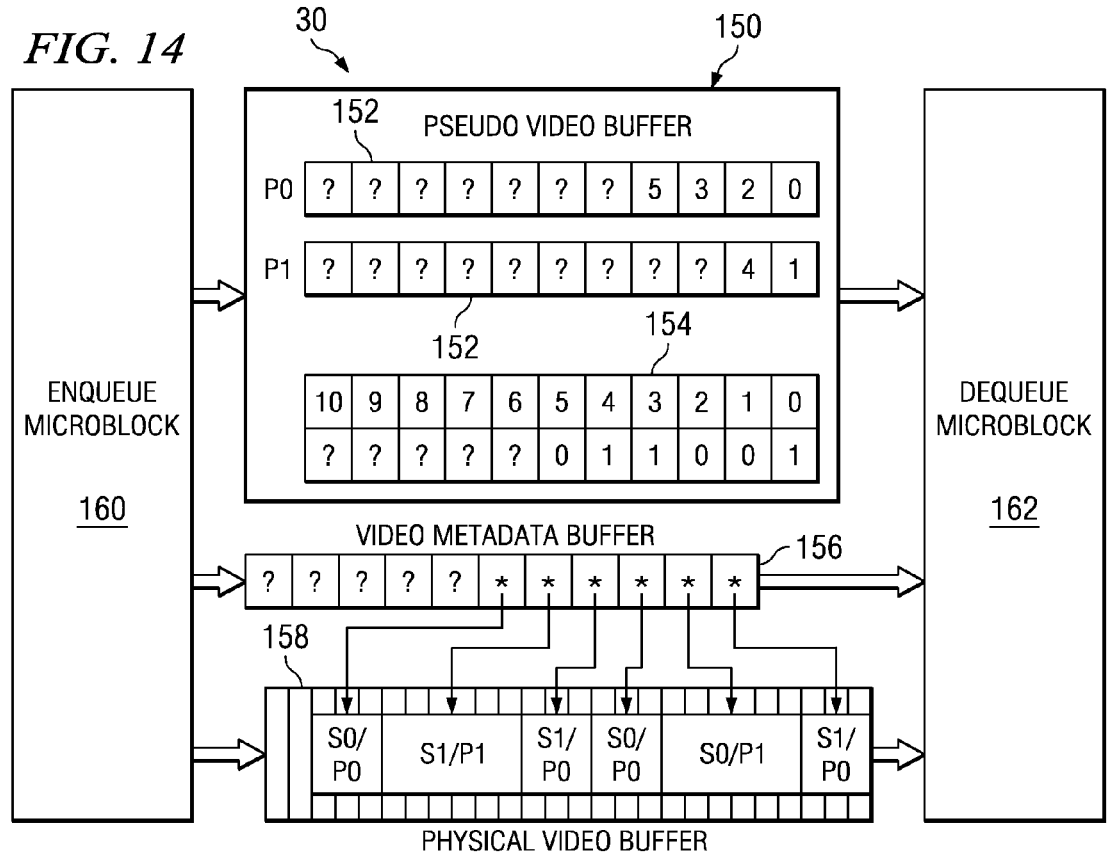

In FIG. 14, the new packet is enqueued, since there is sufficient space in the physical video buffer 158. The forward/discard list 154 adds the newly enqueued packet as index "5" in the list denoting the packet as associated with stream "0". Likewise, index list 152 for P0 is updated to reference the index (5) of the newly enqueued packet. An entry is made in the video metadata buffer 156, which is associated with the packet in the physical video buffer 158. The new buffer fill level is now 24, since the new packet increased the level by three.

Figure 15:
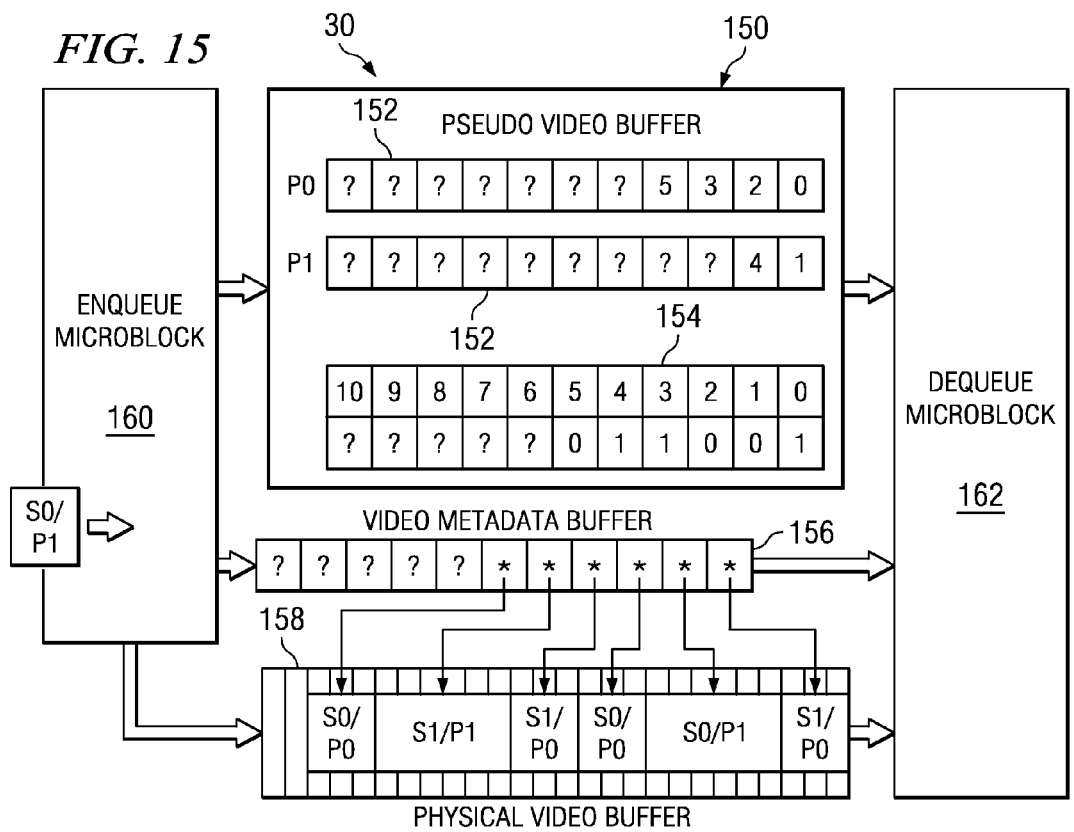

In FIG. 15, another incoming packet (S0/P1-length 6) is at the enqueue microblock 160. Since the packet has a length of six and the physical video buffer 158 has only a length of two available, lower priority packets in the buffer must be marked for discard to accommodate the new packet. As described above, the enqueue microblock looks for packets of low priority (i.e., P0 packets) to discard. Since there are entries in the P0 index buffer 152, there are available packets to discard.

Figure 16:
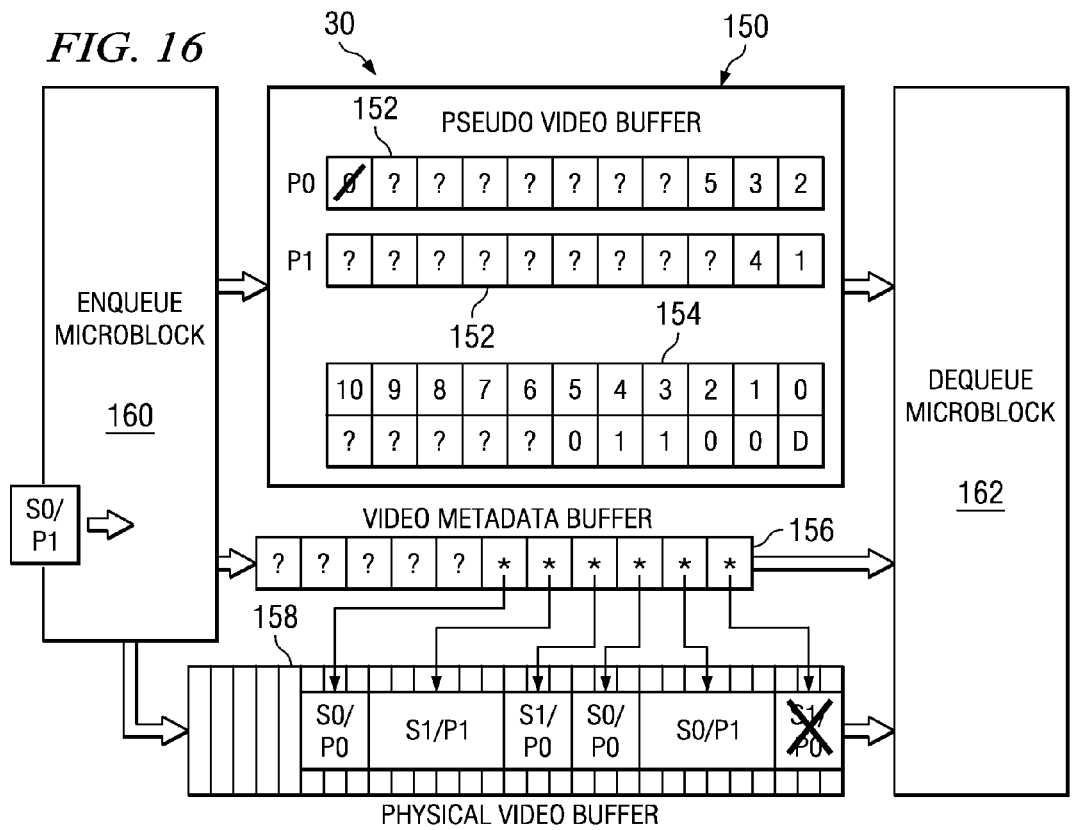

In FIG. 16, the first packet indicated at the head of the P0 index buffer 152 (index 0) is marked for discard in both the index buffer 152 and the forward/discard buffer 154. This packet, although marked for deletion, remains in the physical video buffer 158; however, three units are added to the available length (now five units), because the packet marked for discard will not affect the time for a new packet to move to the front of the physical video buffer.

Figure 17:
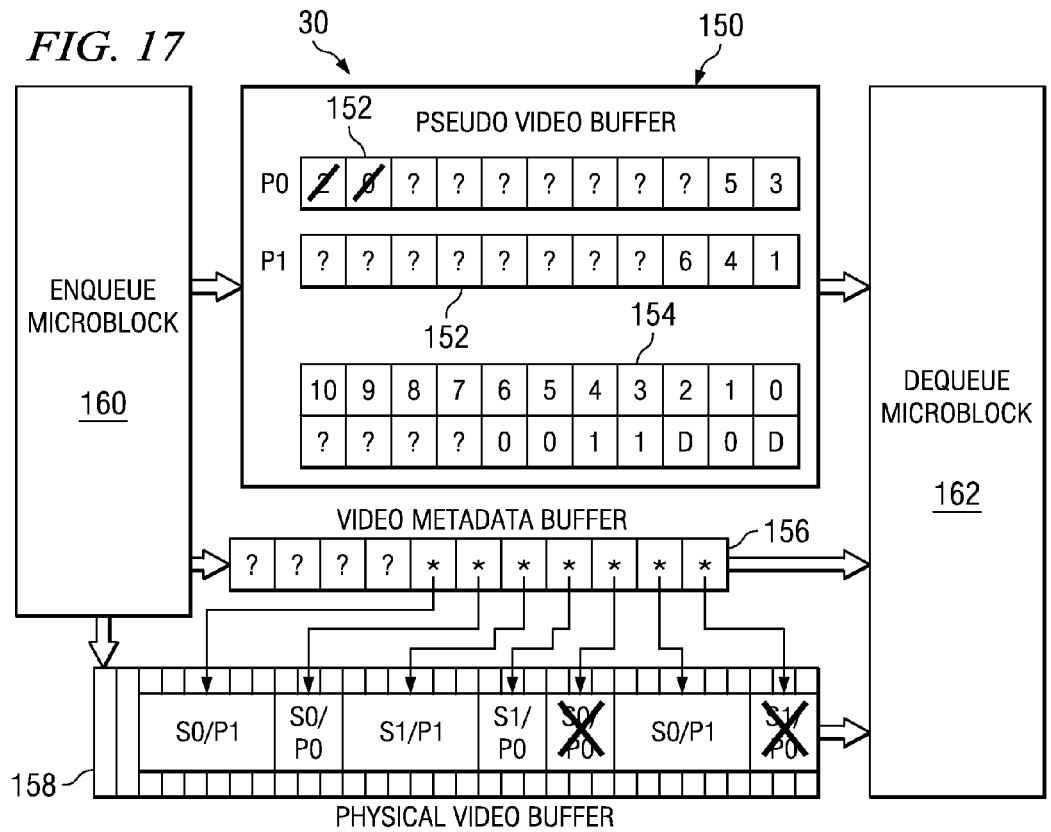

In FIG. 17, with five units available for a new packet and an incoming packet with a length of six, additional packets must be discarded if the incoming packet is to be enqueued. Since there are still entries in the P0 index buffer, there are more packets to discard. Hence, the packet indicated at the head of the P0 index buffer 152 (index 3) is marked for discard in both the index buffer 152 and the forward/discard buffer 154. This results in an available length of eight, allowing the incoming packet to be enqueued in physical video buffer 158. The newly enqueued packet is represented in the forward/discard list 154 at index 6 (denoting the packet as being associated with stream "0"). This information is also added to the P1 index list 152 and the packets metadata is stored in the video metadata buffer 156.

Figure 18:
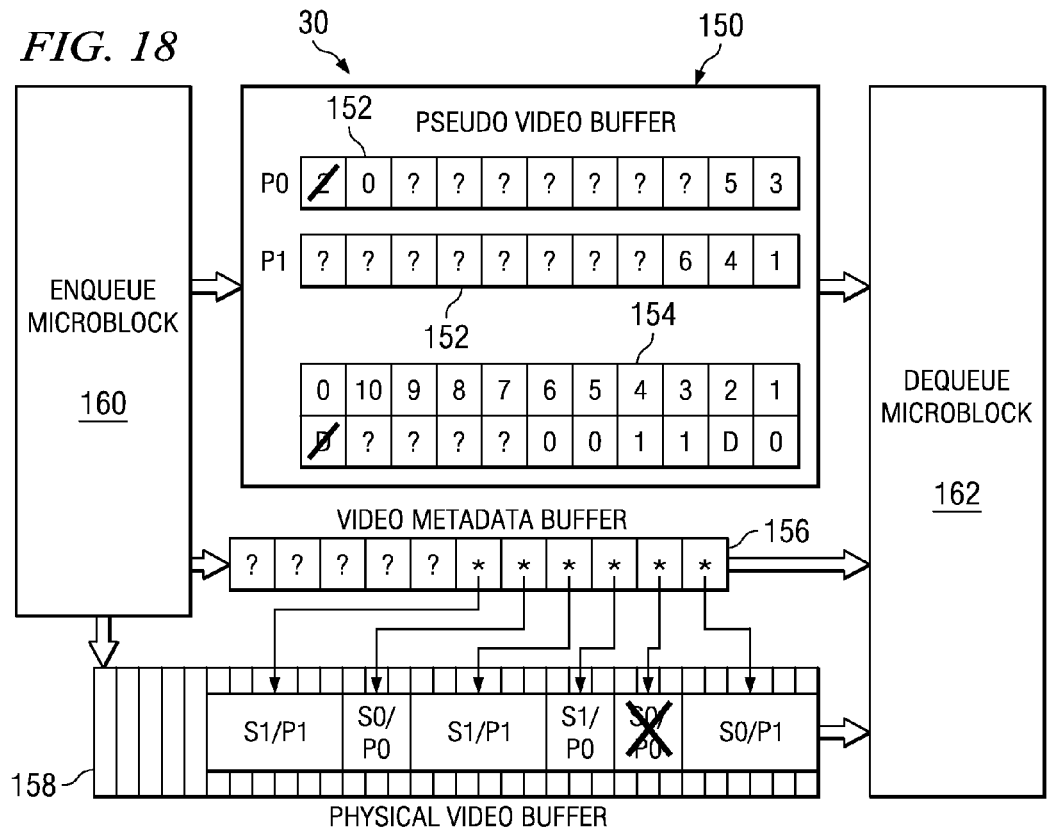

In FIG. 18, the packet marked for discard at the head of the physical video buffer 158 is removed. Because it will not be forwarded, its data will simply be overwritten by the data behind it in the FIFO. This also causes the head of the forward/discard list 154 to rotate so that index "1" is at the front of the list.

In FIG. 19, the packet at the front of the physical video buffer 158 is forwarded to the DSL forwarding circuitry for transmission on link 31. The packet and its metadata is forwarded, and the forward/discard list 154 is updated such that index "2" is moved to the head.

In FIG. 20, a channel change is initiated by the user, switching away from data stream "0". Accordingly, the enqueue microblock 160 scans the entries of the forward/discard list 154 for packets with data stream "0", of which two are listed at index "5" and index "6".

In FIG. 21, the two packets at indices "5" and "6" are marked for discard in the forward/discard list 154 and the index lists 152 for these packets are also updated.

The embodiment of the invention described in FIGS. 9-21 present invention ensures that higher priority packets are delivered to the customer premises, if at all possible. By maintaining lists of packets by priority level, lower priority packets can be easily found without scanning an entire list of packets.

In either embodiment described herein, the receivers may be faced with lost packets. FIG. 22 illustrates a state diagram showing operation of a receiver 22 that can selectively request retransmission of packet or attempt to conceal errors. In state 240, the receiver 22 is in normal mode, receiving packets, decoding the information from the packets and generating video output. When the receiver 22 detects a missing frame, the type of frame is detected in state 242. The frame type will depend upon the protocol; in general within a protocol, the frame type can be determined based on a known order of frame types set by the encoding device. If the missing frame is of a type that can be concealed, error recovery is performed in state 244. If the missing frame is of a type that cannot be concealed, for example an I-frame or a video anchor frame, then retransmission is requested in state 246.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A multiplexer for broadband subscriber access, comprising:
   a memory queue for storing packets of video information;
   a plurality of control flags associated with respective priority, each flag indicating whether a respective predetermined threshold has been met by packets stored in the memory, each threshold being associated with a time-to-dequeue parameter indicative of an expected time period for passing a packet through the multiplexer; and
   input circuitry for selectively storing an incoming packet in the memory queue responsive to the control flags and a priority associated with the incoming packet.

2. The multiplexer of claim 1 and further comprising output circuitry for selectively discarding a packet at a head of said memory responsive to the control flags and a priority associated with the packet at the head.

3. The multiplexer of claim 2 wherein said output circuitry further comprises circuitry for selectively discarding packets associated with a common video frame from the memory queue if a packet associated with the common video frame has already been discarded.

4. The multiplexer of claim 1 wherein said input circuitry further comprises circuitry for not storing the incoming packet in the memory queue if a previous packet associated with a same video frame has been discarded.

5. The multiplexer of claim 1 and further comprising a forward prediction control circuit for setting the control flags based on whether respective thresholds will be exceeded by future incoming packets.

6. The multiplexer of claim 1 and further comprising channel clearing control circuitry for discarding packets associated with a data stream which is no longer being subscribed to.

7. The multiplexer of claim 1 wherein said channel clearing control circuitry further discards packets associated with a new data stream, where the packets are below a predetermined priority.

8. A multiplexer for broadband subscriber access, comprising:
   a memory queue for storing video packets from multiple data streams, wherein each video packet is associated with one of a plurality of priority levels;
   a forward/discard list memory for associating each video packet in the queue with an index and an indicator of the data stream associated with the video packet;
   a priority index list memory for maintaining a list of packets associated with each of said plurality of priority levels; and
   input circuitry for marking existing packets in the memory queue for discard based on information in the priority index list in order to accommodate incoming packets within one or more predetermined parameters, wherein said predetermined parameters include a time-to-dequeue parameter.

9. The multiplexer of claim 8 wherein said input circuitry marks an existing packet for deletion in the forward/discard list by associating a predetermined value with the index associated with the existing packet to be discarded.

10. The multiplexer of claim 9 and further comprising output circuitry for selectively transmitting packets from the memory queue responsive to information in forward/discard list.

11. The multiplexer of claim 9 and further comprising a metadata memory for storing metadata associated with each packet.

12. The multiplexer of claim 11 and further comprising output circuitry for selectively transmitting packets from the memory queue and metadata from the metadata memory responsive to information in forward/discard list.

13. The multiplexer of claim 8 wherein said input circuitry, upon receiving an incoming packet having a known priority level, determines whether enqueuing the incoming packet would violate one or more of said predetermined parameters and, if so, marks one or more existing packets of lower priority than the known priority level for deletion.

14. The multiplexer of claim 8 wherein packet of lower priority are determined through examining a priority index list associated with said lower priority.

15. A method for multiplexing data onto a broadband connection, comprising the step of:
   storing packets of video information in a memory queue;
   maintaining a state for a plurality of control flags associated with respective priority, the state of each flag indicating whether a respective predetermined threshold has been met by packets stored in the memory, each threshold being associated with a time-to-dequeue parameter indicative of an expected time period for passing a packet through to the broadband connection; and
   selectively storing an incoming packet in the memory queue responsive to the control flags and a priority associated with the incoming packet.

16. The method of claim 15 and further comprising the step of selectively discarding a packet at a head of said memory queue responsive to the control flags and a priority associated with the packet.

17. The method of claim 16 wherein said selectively discarding step further comprises selectively discarding packets associated with a common video frame from the head of the memory queue if a packet associated with the common video frame has already been discarded.

18. The method of claim 15 wherein said selectively storing step further comprises the step of not storing the incoming packet if a previous packet associated with a same video frame has been discarded.

19. The method of claim 15 and further comprising the step of setting the control flags based on whether respective thresholds will be exceeded by future incoming packets.

20. The method of claim 15 and further comprising the step of discarding packets associated with a data stream which is no longer being subscribed to.

21. The method of claim 15 and further comprising the step of discarding packets associated with a new data stream, where the packets are below a predetermined priority until a high priority packet associated with the new data stream is received.

22. A method for multiplexing data onto a broadband connection, comprising:
storing video packets from multiple data streams in a memory queue, wherein each video packet is associated with one of a plurality of priority levels;
associating each video packet in the queue with an index and an indicator of the data stream associated with the video packet a forward/discard list;
maintaining a list of packets associated with each of said plurality of priority levels in a priority index list; and
selectively marking existing packets in the memory queue for discard based on information in the priority index list in order to accommodate incoming packets within one or more predetermined parameters, wherein said predetermined parameters include a time-to-dequeue parameter.

23. The method of claim 22 wherein said selectively marking step comprises the step of selectively marking an existing packet for deletion in the forward/discard list by associating a predetermined value with the index associated with the existing packet to be discarded.

24. The method of claim 23 and further comprising the step of selectively transmitting packets from the memory queue responsive to information in forward/discard list.

25. The method of claim 22 and further comprising the step of storing metadata associated with each packet in a metadata memory.

26. The method of claim 25 and further comprising the step of selectively transmitting packets from the memory queue and metadata from the metadata memory responsive to information in forward/discard list.

27. The method of claim 22 wherein said selectively marking step comprises the step of, upon receiving an incoming packet having a known priority level, determining whether enqueuing the incoming packet would violate one or more of said predetermined parameters and, if so, marking one or more existing packets of lower priority than the known priority level for deletion.

28. The method of claim 22 wherein said determining step comprise the step of determining the existence of packets of lower priority through examining the priority index list associated with said lower priority.

* * * * *

UNITED STATES PATENT AND TRADEMARK OFFICE
CERTIFICATE OF CORRECTION

PATENT NO. : 7,609,709 B2  Page 1 of 1
APPLICATION NO. : 11/337372
DATED : October 27, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 815 days.

Signed and Sealed this

Twelfth Day of October, 2010

David J. Kappos
*Director of the United States Patent and Trademark Office*